United States Patent
Furumura et al.

(10) Patent No.: US 9,124,867 B2
(45) Date of Patent: Sep. 1, 2015

(54) APPARATUS AND METHOD FOR DISPLAYING IMAGES

(71) Applicant: Sony Computer Entertainment Inc., Tokyo (JP)

(72) Inventors: Kyoko Furumura, Tokyo (JP); Shinichi Hirata, Kanagawa (JP); Takeshi Yamagishi, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 221 days.

(21) Appl. No.: 13/804,106

(22) Filed: Mar. 14, 2013

(65) Prior Publication Data

US 2013/0229484 A1 Sep. 5, 2013

Related U.S. Application Data

(63) Continuation of application No. PCT/JP2011/004324, filed on Jul. 29, 2011.

(30) Foreign Application Priority Data

Oct. 5, 2010 (JP) ................. 2010-225365

(51) Int. Cl.
 *H04N 13/00* (2006.01)
 *H04N 5/232* (2006.01)
 *G06K 9/36* (2006.01)

(52) U.S. Cl.
 CPC ............ *H04N 13/004* (2013.01); *H04N 5/232* (2013.01); *H04N 5/23238* (2013.01)

(58) Field of Classification Search
 CPC ......... G06T 17/20; G06T 19/00; G06T 17/00; G06T 17/10; G06T 17/005; G06T 3/4038; H04N 5/23238; H04N 5/2628; H04N 5/2259; G02B 13/06
 USPC .............................. 348/36; 345/420; 382/284
 See application file for complete search history.

(56) References Cited

U.S. PATENT DOCUMENTS 6,792,043 B1 * 9/2004 Takahashi et al. ........ 375/240.01
6,879,323 B1 * 4/2005 Takezawa et al. ............ 345/420

(Continued)

FOREIGN PATENT DOCUMENTS

CN 101119443 A 2/2008
CN 101272457 A 9/2008

(Continued)

OTHER PUBLICATIONS

International Search Report for the corresponding PCT Application No. PCT/JP2011/004324, dated Oct. 25, 2011.

(Continued)

*Primary Examiner* — Sath V Perungavoor
*Assistant Examiner* — Howard D Brown, Jr.
(74) *Attorney, Agent, or Firm* — Matthew B. Dernier, Esq.

(57) ABSTRACT

A control point detector detects controls points, with which moving images are associated with a region of a panoramic image, by detecting feature points between the panoramic image and a frame of part of the moving images. An alignment processing unit adjusts the alignment of the moving images relative to the panoramic image, based on the control points. A mapping processing unit maps the panoramic image and a still image frame of the moving images the alignment of which adjusted by the alignment processing unit, onto a three-dimensional (3D) panoramic space as textures. A 3D image generator generates a 3D panoramic image, when the three-dimensional panoramic image is viewed in a specified line of sight. When a moving image reproduction unit receives instructions to reproduce the moving images in the 3D panoramic image, the moving image reproduction unit reproduces the moving images.

12 Claims, 12 Drawing Sheets

(56) References Cited

U.S. PATENT DOCUMENTS

| | | | |
|---|---|---|---|
| 8,350,929 B2 | 1/2013 | Tsurumi | |
| 2002/0180759 A1* | 12/2002 | Park et al. | 345/629 |
| 2005/0225566 A1* | 10/2005 | Kojo | 345/629 |
| 2007/0031062 A1* | 2/2007 | Pal et al. | 382/284 |
| 2009/0016645 A1* | 1/2009 | Sako et al. | 382/298 |
| 2009/0251482 A1* | 10/2009 | Kondo et al. | 345/589 |
| 2010/0079491 A1* | 4/2010 | Nonaka | 345/630 |
| 2010/0118160 A1* | 5/2010 | Tsurumi | 348/231.2 |
| 2010/0315424 A1* | 12/2010 | Cai | 345/427 |
| 2011/0058014 A1* | 3/2011 | Yamashita et al. | 348/36 |
| 2012/0105682 A1* | 5/2012 | Hata et al. | 348/239 |
| 2012/0182400 A1* | 7/2012 | Yamashita et al. | 348/50 |
| 2012/0242780 A1* | 9/2012 | Yamashita et al. | 348/36 |
| 2013/0100132 A1* | 4/2013 | Katayama et al. | 345/420 |
| 2013/0229484 A1* | 9/2013 | Furumura et al. | 348/36 |

FOREIGN PATENT DOCUMENTS

| | | |
|---|---|---|
| CN | 101552874 A | 10/2009 |
| CN | 101715069 A | 5/2010 |
| EP | 0713331 A1 | 5/1996 |
| EP | 2175636 A1 | 4/2010 |
| JP | 11308608 A | 11/1999 |
| JP | 2002259454 A | 9/2002 |
| JP | 2004214830 A | 7/2004 |
| JP | 2004266670 A | 9/2004 |
| JP | 2005269121 A | 9/2005 |
| JP | 2005309921 A | 11/2005 |
| JP | 2006005610 A | 1/2006 |
| JP | 2009159514 A | 7/2009 |
| JP | 2011082917 A | 4/2011 |
| WO | 2009151755 A2 | 12/2009 |

OTHER PUBLICATIONS

International Preliminary Report on Patentability with Written Opinion for the corresponding PCT Application No. PCT/JP2011/004324, dated Apr. 9, 2013.

European Search report for corresponding EP Application No. 11830310, dated Jul. 11, 2014.

JP Office Action for corresponding JP Application No. 2013-228514, dated Sep. 2, 2014.

Office Action for corresponding CN Application No. 201180047929.4, dated May 22, 2015.

* cited by examiner

360

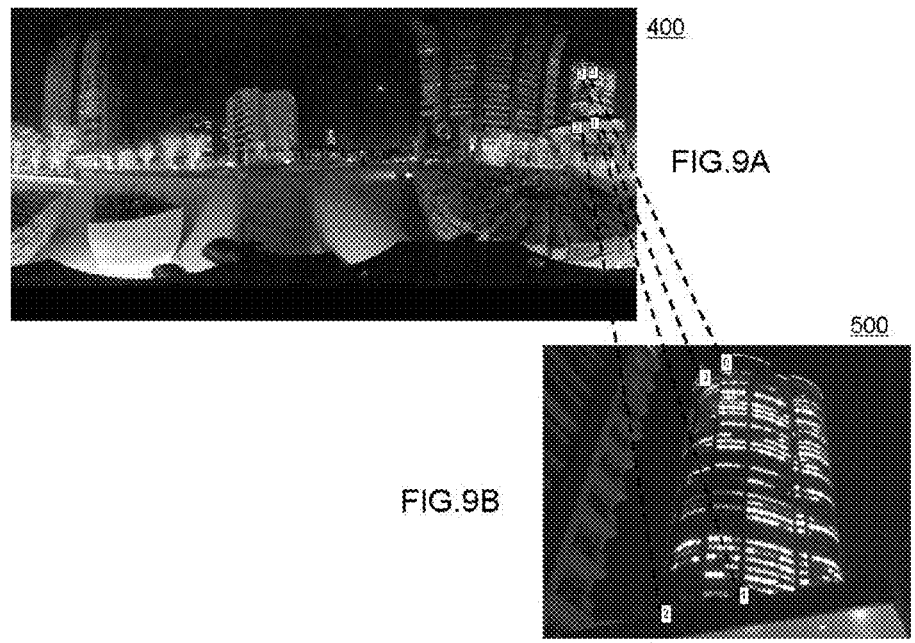
FIG. 10
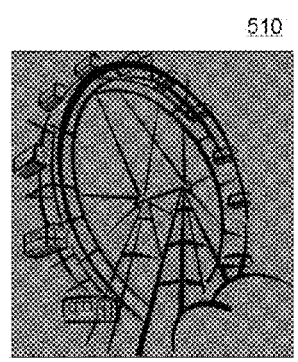
FIG. 11
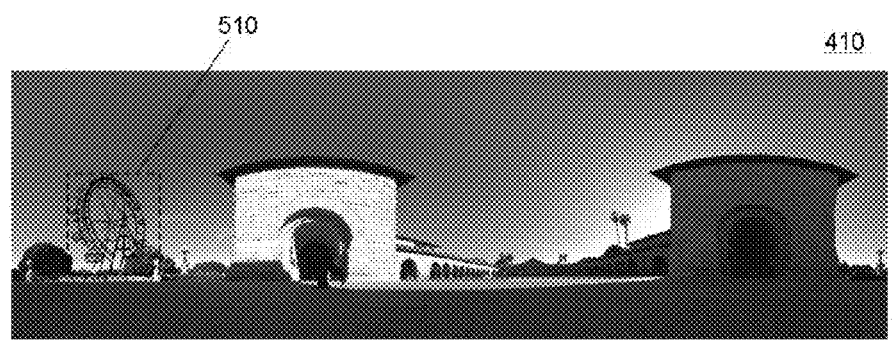

FIG.12
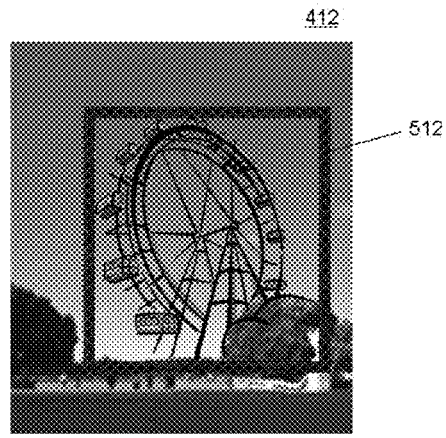
FIG.13
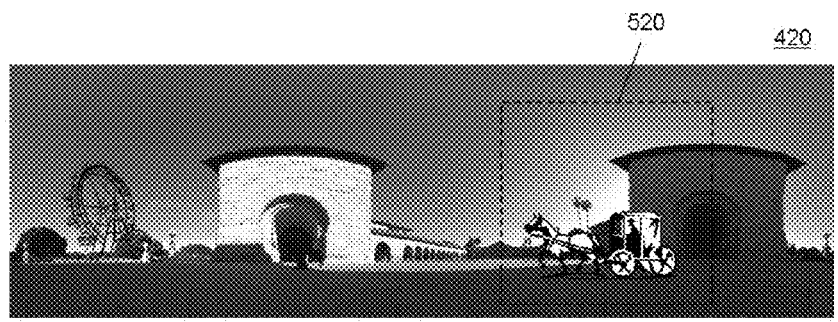
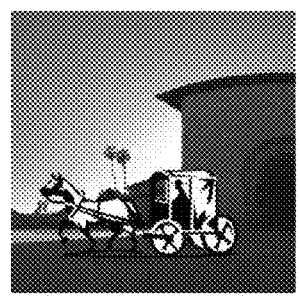 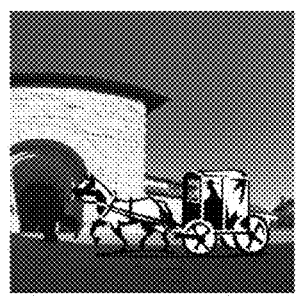 
FIG.14A      FIG.14B      FIG.14C

APPARATUS AND METHOD FOR DISPLAYING IMAGES

BACKGROUND OF THE INVENTION

1. Field of the Invention

The present invention relates to an apparatus and a method for displaying images.

2. Description of the Related Art

With the prevalence of digital still cameras and digital video cameras, there are increased occasions where still images or moving images having been shot are stored in a computer for later viewing, processing, or displaying on the screen of a game device or a television system. It is also popularly done that the shot moving images are uploaded to a posting site on the Internet so as to share them with the other users.

Among the digital cameras are those capable of shooting panoramic images, which allow the image taking of panoramic images of wide view angle with perfect ease. Also in wide use are software tools that can generate a panoramic image by stitching together a plurality of images shot by a digital camera from different shooting directions.

There is a site named "360cities" (http://www.360cities.net) that accepts the posting of panoramic images shot by users and show them on the Internet, so that the users around the world can view the panoramic images posted.

If the panoramic image is a still image, there may be cases where a user wishes to supply moving images to part of objects captured in the panoramic image, instead of the still image. For example, consider that the panoramic image of a night view is shot. Though the still image of such a night view as a panoramic image looks lovely enough for the viewing, a sense of reality and its actual beauty may be further gained if moving images are used and the user can see how the illumination of some buildings goes on and off, for instance. Also, an active feeling can be added to the panoramic image if the moving images of a moving object are shot. Further, when an overall scenery is looked at through the panoramic image and then an object of interest is viewed in detail by focusing on the object, provision of moving images to such a panoramic image may result in gathering much information.

SUMMARY OF THE INVENTION

The present invention has been made in view of these problems, and a purpose thereof is to provide a technology for effectively displaying a moving image or moving images within an object image.

In order to resolve the above-described problems, an image display apparatus according to one embodiment of the present invention includes: a detector configured to extract a feature point between an object image and a frame of part of a moving image to be pasted onto the object image, and configured to detect a control point with which the moving image are associate with a region of the object image; an alignment processing unit configured to adjust alignment of the moving image relative to the object image based on the control point; a mapping processing unit configured to map the object image and a still image frame of the moving image the alignment of which adjusted by the alignment processing unit, onto a three-dimensional (3D) object space as a texture; a three-dimensional (3D) image generator configured to generate a three-dimensional (3D) object image, when the three-dimensional object image mapped by the mapping processing unit is viewed in a specified line of sight in such a manner so as to regard a shooting location of the object image as a viewpoint position; a display control unit configured to display the 3D object image on a screen; and an interface configured to receive an instruction from a user concerning the displayed 3D object image; and a moving image reproduction unit configured to reproduce the moving image, when the interface receives an instruction to reproduce the moving image onto the 3D object image.

Another embodiment of the present invention relates also to an image display apparatus. The apparatus includes: an alignment processing unit configured to adjust alignment of frame of at least part of a moving image relative to an object image, when upon receipt of the object image and the moving image to be pasted onto the object image; a display control unit configured to display both a still image frame of the moving image, the alignment of which adjusted by the alignment processing unit, and the object image in a manner such that the still image frame thereof is superimposed onto the object image; an interface configured to receive an instruction from a user concerning the object image displayed by the display control unit; and a moving image reproduction unit configured to reproduce the moving image, when the interface receives an instruction to reproduce the moving image onto the three-dimensional object image. When the interface receives an instruction to zoom in on a region containing the moving image in the object image, the moving image reproduction unit starts to reproduce the moving image instead of the still image frame of the moving image.

Still another embodiment of the present invention relates to a method for displaying images. The method includes: reading out, from a storage device by a processor, an object image and a moving image to be pasted onto the object image, and configured to adjust alignment of a frame of at least part of the moving image relative to the object image, displaying, by a processor, a still image frame of the moving image, the alignment of which adjusted, and the object image in a manner such that the still image frame thereof is superimposed onto the object image; receiving, by a processor, an instruction from a user concerning the displayed object image; and initializing reproduction, by a processor, of the moving image instead of the still image frame of the moving image, when an instruction is received to zoom in on a region containing the moving image on the object image.

Optional combinations of the aforementioned constituting elements, and implementations of the invention in the form of methods, apparatuses, systems, computer programs, data structures, recording media and so forth may also be effective as additional modes of the present invention.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which:

FIG. 9A and FIG. 9B are examples of a panoramic image and a moving image to be pasted onto the panoramic image, respectively;

FIG. 10 shows another moving image to be pasted onto a panoramic image;

FIG. 11 is a panoramic image to which the moving image of FIG. 10 has been pasted;

FIG. 12 is an image displayed when the panoramic image shown in FIG. 11 is zoomed in on a region thereof where a moving image has been pasted;

FIG. 13 shows a panoramic image to which a moving image has been pasted;

FIGS. 14A, 14B and 14C each shows how a moving image is reproduced by zooming in on a region of the moving image in a panoramic image;

DETAILED DESCRIPTION OF THE INVENTION

A description will be given of an outline of a preferred embodiment. Still image frames in moving images are aligned and stitched into a panoramic image. When a region in a moving image or moving images in the moving images is/are zoomed in, the reproduction of the moving images starts in place of the still image frames that have been displayed so far. Assume herein that the moving images shot contain a camera-shake component. Then an artifact or noise may occur in an image at a boundary region of the moving images with the panoramic image. Thus, an adverse effect of camera shake is reduced by alpha-blending the moving images and the panoramic image at the boundary region. As the reproduction of the moving images is interrupted and a region is zoomed out, the frame displayed last is again alighted to the panoramic image. Or the region may be displayed by switching to the original panoramic image when it is zoomed out.

Figure 1:
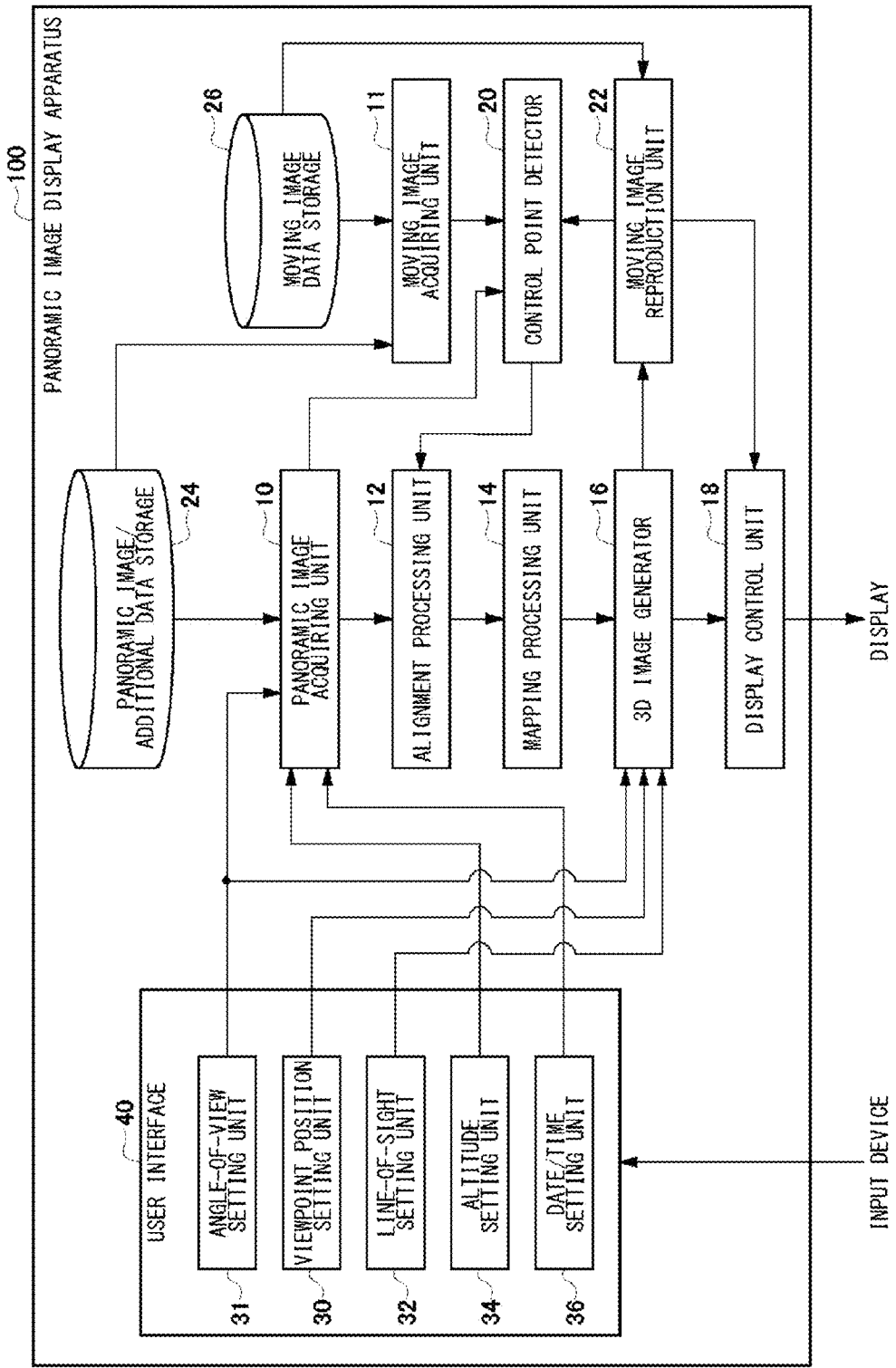
FIG. 1 is a configuration diagram of a panoramic image display apparatus according to an embodiment.

FIG. 1 is a configuration diagram of a panoramic image display apparatus 100 according to a preferred embodiment. For example, the panoramic image display apparatus 100 as shown in FIG. 1 may be functionally configured such that hardware, software or a combination of both is implemented to a personal computer, a game device, a portable device, a mobile terminal and so forth. Part of such functional components may be implemented in a client, so that the panoramic image display apparatus 100 may be realized as a server-client system via a network.

A panoramic image/additional data storage 24 stores panoramic images having information on shooting locations and information on shooting orientations associated with each other. The additional data, such as information on shooting locations and shooting orientations, may be added directly to a data file of panoramic images, or may be managed as a separate file from the panoramic images.

The information on shooting locations includes, for instance, information on latitudes and longitudes given by GPS (Global Positioning System). The information on shooting orientation includes, for instance, information on the azimuth (angle of orientation) of the center point of a panoramic image obtained from an azimuth sensor, and may also additionally include information on the elevation angle and roll angle of a camera at the time of shooting.

If the azimuth of the center point of a panoramic image is given as information on a shooting orientation, then it is possible to calculate the orientation of an arbitrary point of the panoramic image based on the angle of panning the camera to the right or left. The panoramic images may have, as the information on the shooting orientations, the coordinate values of pixels in the orientations of true north, true south, true east, and true west of the panoramic images that are calculated based on the azimuths and pan angles of the center points of the panoramic images.

A panoramic image acquiring unit 10 acquires a panoramic image to be displayed from the panoramic image/additional data storage 24. The panoramic image to be displayed is identified as the user specifies a shooting location on a map or the like.

A moving image data storage 26 stores moving images associated with the information on shooting locations. The information on shooting locations includes, for instance, information on latitudes and longitudes given by GPS at the time of shooting. The information on shooting locations may be a specific name of an object shot such as a geographical name and the name of facilities.

A moving image acquiring unit 11 acquires moving image(s), which is/are to be pasted onto a panoramic image, from the moving image data storage 26. The moving image acquiring unit 11 may acquire the information on shooting locations acquired by the panoramic image acquiring unit 10 from the panoramic image/additional data storage 24 and then acquire moving images shot at the same shooting location or its vicinity from the moving image data storage 26. The shooting locations may be identified using the information on latitudes and longitudes or may be indirectly identified by specifically identifying the name of a place and the facility name.

If there are a plurality of sets of moving images shot at the same location but shot at different times of day or different seasons, the moving image acquiring unit 11 may select moving images suitable to the times of day and the season when the panoramic image was shot. If, a panoramic image is shot in the spring, moving images shot in the spring will be selected; if it is shot during night hours, those shot at night will be selected.

A control point detector 20 extracts feature points between a panoramic image and a frame or frames of moving images and thereby detects control points that associate the panoramic image with the moving images. Since processing is time consuming if the feature points of all frames of the moving images are to be extracted, only several frames from the beginning of the moving images are selected, for example, and then control points between the panoramic image and those several frames thereof are extracted. A known art used for the image matching may be used as a feature point extraction process.

Upon completion of the processing of the feature point extraction, control points best suited for the association of a frame of the moving images with a region of the panoramic image is selected from among the extracted feature points. Though a multiplicity of feature points are extracted, it is desirable that the control points be evenly scattered over the entire region. More preferably, selected are the control points located near or at grid points, which are obtained when the frame of the moving images are divided into a plurality of regions in grid, so that the frame of the moving images can be aligned with great accuracy to the panoramic image.

An alignment processing unit 12 adjusts the alignment of the moving images relative to the panoramic image, based on the control points. More specifically, the size of the moving images is changed by enlarging or reducing the moving images so that the control points of the panoramic image can correspond to those of the frame of the moving images. Since the panoramic image has a distortion caused by a wide-angle image taking, the frame of the moving images should be deformed according to the distortion in the panoramic image. As a result, a pan angle, a tilt angle, a roll angle, a scale and the like of the frame of moving image are required and thus obtained to map the frame of the moving image into the panoramic image.

Note that the control points are set for the several frames from the beginning of the moving images, for example. Thus, each of those frames is aligned to a region of the panoramic image, based on the control points. Here, the optimum pan angle, tilt angle, roll angle and scale for each of those frames may be determined by a method of least squares. The moving images are associated with the region of the panoramic image, based on the finally determined alignment. A frame of moving image, which is, for example, the leading frame of moving image, is pasted onto the region of the panoramic region, as a still image. Here, the single frame of moving image pasted thereon is a frame obtained, after the alignment processing has been done, based on the finally determined pan angle, tilt angle, roll angle and scale.

A mapping processing unit 14 processes a mapping of a panoramic image and the alignment-processed still image frame of moving images into a three-dimensional panoramic space as textures.

In the case of a spherical, or omnidirectional (celestial), panoramic image, a sphere is assumed as a three-dimensional panoramic space, and the panoramic image is texture-mapped onto the spherical surface by a sphere mapping. Or a cube may be assumed as a three-dimensional panoramic space, and the panoramic image may be texture-mapped onto the cubic surface by a cube mapping. Also, in the case where the panoramic image does not have any component in tilt directions and spreads only in the panning directions, a cylinder may be assumed as a three-dimensional panoramic space, and the panoramic image may be texture-mapped onto the cylindrical surface by a texture mapping. The same applies to the case where the panoramic image does not have any component in the panning directions and spreads only in tilt directions.

A 3D image generator 16 generates a three-dimensional (3D) panoramic image when the 3D panoramic space having a panoramic image and a still image frame mapped thereon by the mapping processing unit 14 is viewed in a specified line of sight. When the 3D panoramic space is a sphere, the viewpoint is placed at the center of the sphere. When the 3D panoramic space is a cube, the viewpoint is placed at the center of the interior of the cube. And when the 3D panoramic space is a cylinder, the viewpoint is placed on the center axis of the cylinder. The viewpoint is the location where the panoramic image to be displayed is shot, and the line of sight is the direction in which the surrounding area is viewed and is thus identified by the azimuth and the elevation angle. The 3D image generator 16 generates a 3D image when the 3D panoramic space is viewed in the line of sight identified by the azimuth and the elevation angle.

A moving image reproduction unit 22 reproduces the moving images pasted within a 3D panoramic image generated by the 3D image generator 16 and then supplies it to a display control unit 18. A link to the moving image data stored in the moving image data storage 26 is provided to the region where the moving images in the panoramic image are pasted. The moving image reproduction unit 22 reads out the moving image data, which is coded based on the link information, from the moving image data storage 26, then decodes the coded moving image data, and reproduces the thus decoded moving image data.

A display control unit 18 has the thus generated 3D panoramic image displayed on a screen of a display unit. Also, the moving image reproduction unit 22 displays the moving images reproduced by the moving image reproduction unit 22, on the screen of the display unit.

The reproduction of moving images starts automatically when, for example, the region of the panoramic image, where a still image frame of moving images is pasted, is zoomed in. Also, a symbol indicating the presence of moving images in the region of the panoramic image where a still image frame of moving images is pasted may be displayed, so that the moving images can be reproduced when a user selects the symbol.

Assume that, during reproduction of moving images, the pan angle, the tilt angle and/or the roll angle of a camera is/are varied between frames and that the zoom factor is also varied, for example, and therefore the shooting direction or shooting magnification ratio is greatly varied. In such a case, the processing of the feature point extraction may be carried out between several frames after the change in the shooting direction or shooting magnification ratio (such frames being called "latest frames" or "most recent frames" also) and the panoramic image, and then new control points may be detected from the extracted feature points. As a result, the information regarding the newly detected control points may be supplied to the alignment processing unit 12.

In this case, the alignment unit 12 readjusts the alignment of the moving images relative to the panoramic image, based on the new control points and associates the most recent frames of the moving images with the region of the panoramic image. The mapping processing unit 14 maps the finally-displayed frames of the moving images that have been subjected to the alignment processing, together with the panoramic image, into the 3D panoramic space. As a result, the moving images are appropriately aligned to the panoramic image based on the most recent information on alignment, and the moving images aligned thereto are displayed within the panoramic image.

A first alignment processing of the moving images is carried out based on the control points detected from several frames including the frames at the beginning of the moving images and its subsequent ones. As frames during reproduction based on a first alignment result are displayed in the region of the panoramic image, a mismatch or inconsistency may occur if the shooting direction or shooting magnification ratio of the camera is varied. In such a case, control points of the frames during reproduction are detected anew and then the alignment is readjusted, so that the frames of the moving images during reproduction thereof can be accurately associated with the region of the panoramic image.

If, in particular, the shooting location moves while the moving images are taken, the position of the panoramic image to which the frames during reproduction are to be pasted will be moved from the pasting position determined by the first alignment processing. Thus, the frames during reproduction can be properly associated with the moved position of the moving images if the control points are detected again and the alignment processing is carried out again.

The alignment of the moving images may be readjusted when the reproduction of moving images end or is interrupted. The moving images are reproduced when a region of the panoramic image, to which a still image frame or still image frames of the moving images are pasted, is zoomed in. Thus, even though the frames during reproduction are not aligned appropriately, such a misalignment may be negligible. However, if the reproduction of moving images ends or is interrupted and a frame displayed at the end of the moving images (hereinafter referred to as a "last displayed frame") after the moving images have been zoomed out and if the last displayed frame is not properly aligned to the panoramic image, such a misalignment may look unnatural. In the light of this, the control point detector 20 may perform the processing of the feature point extraction between the last displayed frame and the panoramic image so as to newly detect control points, and the alignment processing unit 12 may readjust the alignment of the moving images relative to the panoramic image, based on the newly detected control points. As a result, the last displayed frame of the moving images is associated with the region of the panoramic image. Thereby, the last displayed frame of the moving images, namely the last frame if the reproduction of the moving images has been completed or namely a frame displayed at the time of interruption if the reproduction thereof has been interrupted in the middle of reproduction, is appropriately aligned to the panoramic image and displayed within the panoramic image.

If, during reproduction of moving images, the shooting direction or shooting magnification ratio varies between frames in excess of a predetermined threshold, the control point detector 20 will new control points between the most recent frame and the panoramic image. However, at the time when the shooting direction or shooting magnification ratio varies between frames in excess of the predetermined threshold, the alignment processing unit 12 may not readjust the moving image but store only the information on the new controls points in memory and the alignment processing unit 12 may readjust the moving images as necessary, such as when the panoramic image is zoomed out.

Figure 2:
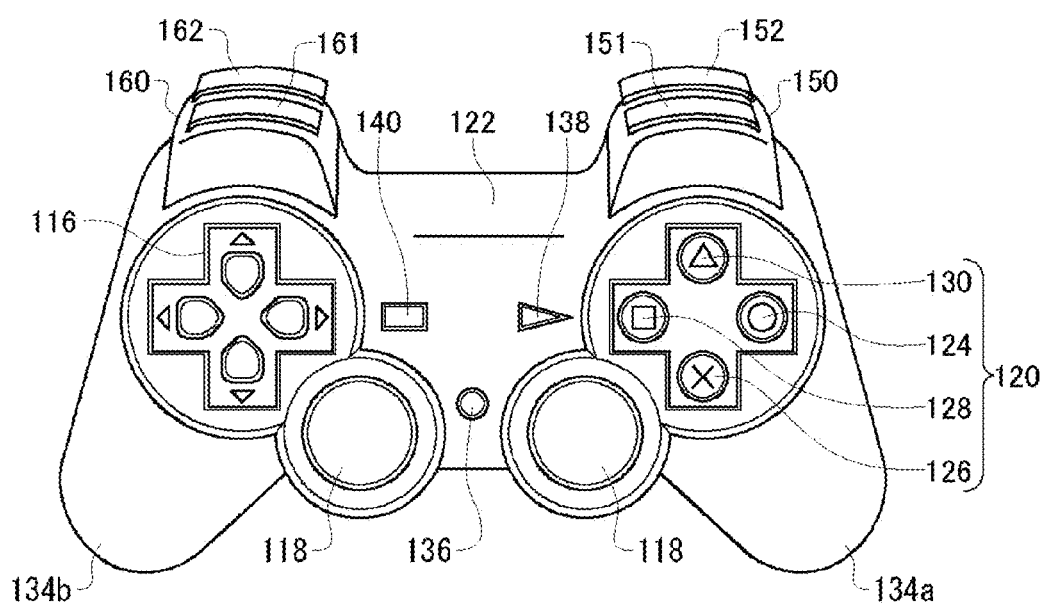
FIG. 2 shows a structure of a controller, connected to the panoramic image display apparatus of FIG. 1, which is an example of an input device.

A user interface 40 is a graphical user interface through which the user can manipulate the graphics displayed on the screen of a display using an input device. The user interface 40 receives user instructions on the map or 3D panoramic image displayed on the screen from the input device which may be a controller of a game device, a mouse, a keyboard, or the like. FIG. 2 shows a controller 102 as an example of the input device, whose construction will be discussed in detail later. If there is no entry from the input device for a predetermined period of time, an operation command may be executed on the map or 3D panoramic image displayed on the screen by a script reproduction unit.

The user interface 40 instructs the panoramic image acquiring unit 10 to acquire a specified panoramic image from the panoramic image/additional data storage 24.

The user can input instructions to change the line of sight for viewing the 3D panoramic space by operating an analog stick 118 or direction keys 116 of the controller 102, for instance. A line-of-sight setting unit 32 of the user interface 40 gives a line of sight instructed by the user to the 3D image generator 16. The 3D image generator 16 generates an image when the 3D panoramic space is viewed in a specified line of sight.

An angle-of-view setting unit 31 sets an angle of view when the user has performed a zoom operation on the panoramic image being displayed and gives the information of the angle of view thus set to the panoramic image acquiring unit 10 and the 3D image generator 16. Where panoramic images of different angles of view are stored in the panoramic image/additional data storage 24, the panoramic image acquiring unit 10 reads out a panoramic image of an angle of view closest to the set angle of view and changes the panoramic image to be displayed. The 3D image generator 16 realizes the visual effects of zoom-in and zoom-out by enlarging or reducing the 3D panoramic image according to the set angle of view.

A panoramic image may have information on the shooting altitude, and the panoramic image/additional data storage 24 may store panoramic images shot at different altitudes at the same shooting location. In such a case, the user can input instructions to change the altitude by operating L1/L2 buttons 161 and 162 provided on the left front of the casing of the controller 102, for instance. Pressing the L1 button 161 will give an instruction to raise the altitude, and pressing the L2 button 162 will give an instruction to lower the altitude.

The display control unit 18 may indicate to the user, for instance, with small arrows at the top and bottom portions of the screen that the panoramic image currently being displayed has panoramic images shot at different altitudes at the same shooting location. An arrow facing upward in the top portion of the screen indicates the presence of a panoramic image shot at a higher altitude than the current one, and an arrow facing downward in the bottom portion of the screen indicates the presence of a panoramic image shot at a lower altitude than the current one.

Upon receipt of an instruction from the user to change the altitude, the altitude setting unit 34 of the user interface 40 instructs the panoramic image acquiring unit 10 to acquire a panoramic image corresponding to the specified altitude, despite the same shooting place, from the panoramic image/additional data storage 24. The panoramic image acquiring unit 10 acquires a panoramic image of a higher shooting altitude than the panoramic image currently being displayed when the L1 button 161 is pressed, and acquires a panoramic image of a lower shooting altitude than the current one when the L2 button 162 is pressed.

When a display is produced by switching to a panoramic image of a different shooting altitude, the display control unit 18 may give a special effect to the image so that the user may have a sense of riding an elevator up or down. For example, when switching to a panoramic image of a higher altitude, the panoramic image currently being displayed can be scrolled downward, thereby having the panoramic image of a higher altitude descend from above with the result that the user may have a sense of having risen upstairs.

A panoramic image contains information on the shooting date and time, and the panoramic image/additional data storage 24 may store panoramic images shot at different dates and times at the same shooting location. In such a case, the user can input instructions to change the date and time by operating R1/R2 buttons 151 and 152 provided on the right front of the casing of the controller 102, for instance. Pressing the R1 button 151 will give an instruction to shift to a later date and time, and pressing the R2 button 152 will give an instruction to shift to an earlier date and time.

The display control unit 18 may indicate to the user, for instance, with watch and calendar icons in the corner of the screen that the panoramic image currently being displayed has panoramic images shot at different dates and times. Watch icons may be displayed to indicate the presence of panoramic images for different times of day such as morning, noon, and night, whereas calendar icons may be displayed to indicate the presence of panoramic images for different seasons such as spring, summer, autumn, and winter.

Upon receipt of an instruction from the user to change the date and time, the date/time setting unit 36 of the user interface 40 instructs the panoramic image acquiring unit 10 to acquire a panoramic image corresponding to a specified date and time at the same shooting location from the panoramic image/additional data storage 24. The panoramic image acquiring unit 10 acquires a panoramic image of a later shooting date and time than the panoramic image currently being displayed when the R1 button 151 is pressed, and acquires a panoramic image of an earlier shooting date and time than the current one when the R2 button 152 is pressed.

Thus, it is possible to switch the panoramic image being displayed to panoramic images of a different time of day or season at the same shooting location, for example, from one shot in the morning to one shot at night, or from one shot in the spring to one shot in the autumn. In changing the panoramic image, the display control unit 18 may give an effect of fade-in and fade-out to the image.

A viewpoint position setting unit 30 set the shooting location of a panoramic image as a viewpoint position and conveys it to the 3D image generator 16. The line-of-sight setting unit 32 sends the specified line-of-sight to the 3D image generator 16.

FIG. 2 shows a structure of a controller, connected to the panoramic image display apparatus of FIG. 1, which is an example of an input device. The panoramic image display apparatus 100 may be a game device, for instance.

The controller 102 has a plurality of buttons and keys to receive control inputs to the panoramic image display apparatus 100. As the user operates on the buttons or keys of the controller 102, their operation inputs are transmitted to the panoramic image display apparatus 10 through wireless or wired connections.

Provided on a casing top surface 122 of the controller 102 are a group of arrow keys 116, analog sticks 118, and a group of operation buttons 120. The group of direction keys 116 include "up-", "down-", "left-", and "right-" direction indication keys. The group of operation buttons 120 include a circle button 124, a cross button 126, a square button 128, and a triangle button 130.

The user holds a left-hand grip 134b with the left hand and holds a right-hand grip 134a with the right hand, and operates the group of direction keys 116, the analog sticks 118, and the group of operation buttons 120 on the casing top surface 122.

Provided on a front side of the controller 102 are a right-hand operation part 150 and a left-hand operation part 160. The right-hand operation part 150 includes an R1 button and an R2 button, whereas the left-hand operation part 160 includes an L1 button 161 and an L2 button 162.

The user can shift a pointer displayed on the screen in vertical and horizontal directions by operating the directional key group 116. For example, when selecting one of a plurality of markers displayed within a panoramic image, the user can shift the pointer between the plurality of markers on the screen by operating the directional key group 116. The user can select a desired marker by pressing the circle button 124 when the pointer has come upon the marker.

Different functions may be assigned to the respective buttons of operation buttons 120 by a panoramic image display application program. For example, the function to specify the display of a menu is assigned to the triangle button 130, the function to specify the cancel of a selected item is assigned to the cross button 126, the function to specify the determination of a selected item is assigned to the circle button, and the function to specify the display/non-display of table of contents or the like is assigned to the square button 128.

The analog sticks 118 have means to output analog values as they are tipped by the user. The controller 102 sends an analog output signal corresponding to the direction and amount of tipping of the analog stick 118 to the panoramic image display apparatus 100. For example, the user can shift the viewpoint in a desired direction within a 3D panoramic image shown on the display by tipping the analog stick 118 in the desired direction.

The casing top surface 122 is further provided with an LED button 136, a selector button 140, and a start button 138. The LED button 136 is used as the button for the display of the menu screen on the display, for instance. The start button 138 is the button with which the user instructs the start of a panoramic image display application, the start or pause of playback of a panoramic image, or the like. The selector button 140 is the button with which the user instructs a selection from a menu display shown on the display or the like.

FIGS. 3A to 3D are illustrations with which to explain the mechanism and shooting directions of an omnidirectional image shooting system 230 used to shoot panoramic images.

Figure 3A:
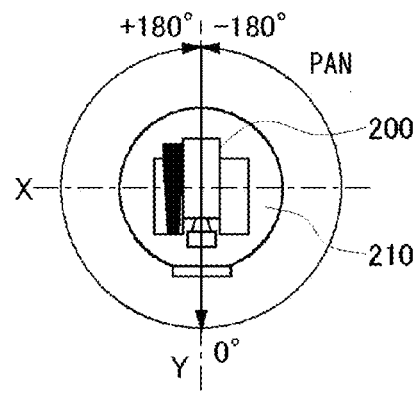
FIGS. 3A to 3D are illustrations with which to explain the mechanism and shooting directions of an omnidirectional image shooting system used to shoot panoramic images.
Figure 3B:
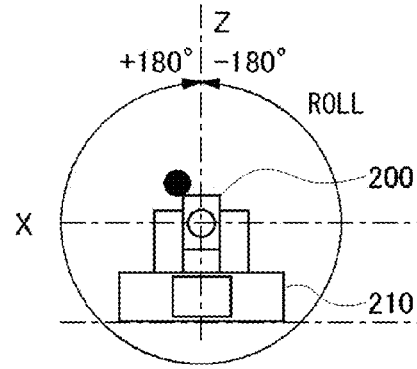
Figure 3C:
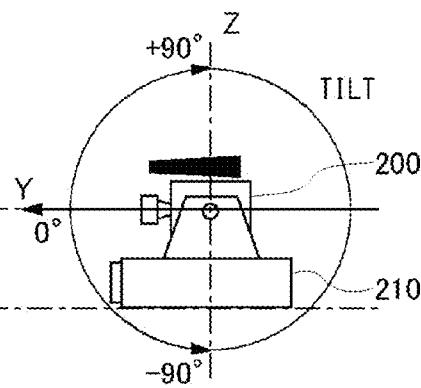
Figure 3D:
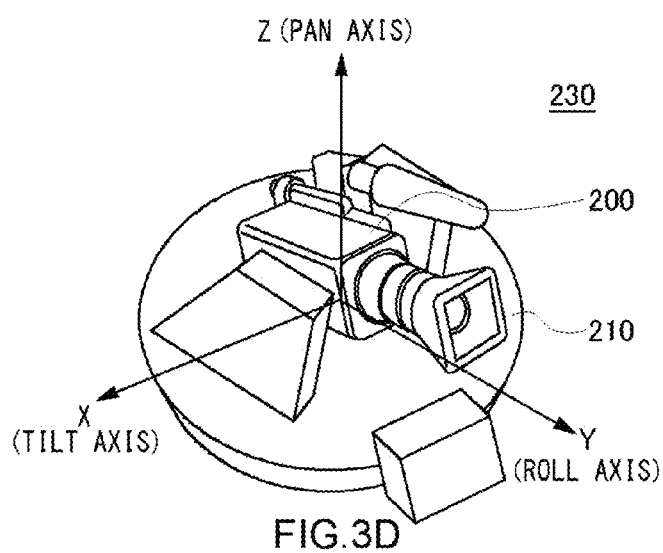

As shown in FIG. 3D, a camera 200 in the omnidirectional image shooting system 230 is secured onto a control disk 210. And a camera's pan angle can be changed as the control disk 210 is rotated around a Z axis, a camera's tilt angle can be changed as the control disk 210 is rotated around an X axis, and a camera's roll angle can be changed as the control disk 210 is rotated around a Y axis. The Z axis herein is the vertical axis (gravitational direction axis).

FIG. 3A is a top view of the camera 200 installed on the control disk 210. The initial position (Y-axis direction) of the control disk is pan angle 0°, and the pan angle can be changed within a range of −180° to +180° around the Z axis.

FIG. 3B is a front view of the camera 200 installed on the control disk 210. The horizontal state of the control disk 210 is roll angle 0°, and the roll angle can be changed within a range of −180° to +180° around the Y axis.

FIG. 3C is a side view of the camera 200 installed on the control disk 210. The horizontal state of the control disk 210 is tilt angle 0°, and the tilt angle can be changed within a range of −90° to +90° around the X axis.

In order to endow a panoramic image shot by the omnidirectional image shooting system 230 of FIG. 3D with information on the shooting orientations, it is necessary to record the orientations of the camera 200 at the time of image taking. For that purpose, the omnidirectional image shooting system 230 is provided with an azimuth sensor for measuring orientations and an acceleration sensor for measuring tilt angles. The ominidirectional image shooting system 230 is further provided with a GPS sensor or the like for measuring the shooting location and time.

Figure 4A:
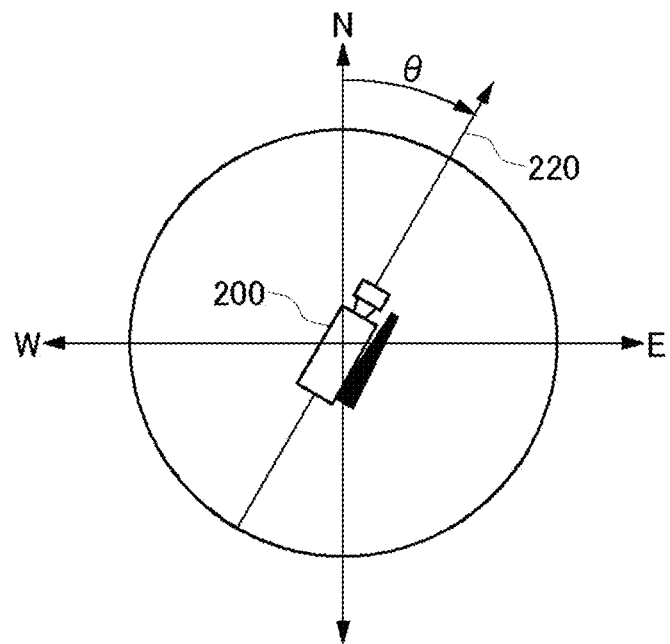
FIG. 4A is an illustration with which to explain azimuth angle $\theta$ of a camera.
Figure 4B:
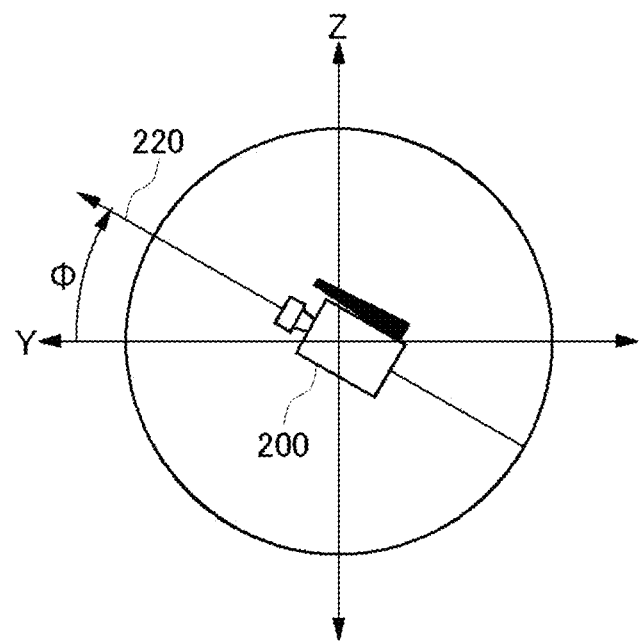
FIG. 4B is an illustration with which to explain elevation angle $\phi$ of a camera.

FIG. 4A is an illustration with which to explain azimuth angle $\theta$ of the camera 200, and FIG. 4B is an illustration with which to explain elevation angle $\phi$ of the camera 200. FIG. 4A is a top view of the camera 200, in which the camera 200 in an initial position of shooting faces a direction 220 which is azimuth angle $\theta$ displaced from true north to east. This direction is equal to pan angle 0°. In other words, the azimuth angle of the reference direction 220 of the pan angle is $\theta$. When shooting a panoramic image, the image of an object is taken panoramically by changing the pan angle in a range of −180° to +180° with respect to the reference direction 220 of the azimuth angle $\theta$.

FIG. 4B is a side view of the camera 200. The elevation angle $\phi$ is the direction of tilt 0°, which is an angle where an upper direction is defined to be positive in relation to the Y-axis direction, when the camera 200 is rotated around the X axis. Normally, the elevation angle is 0° since the image taking is done with the camera 200 set in a horizontal position. To shoot a spherical panoramic image, however, it is necessary to take the images of the object by changing the elevation angle φ with the tilt of the camera.

Figure 5A:
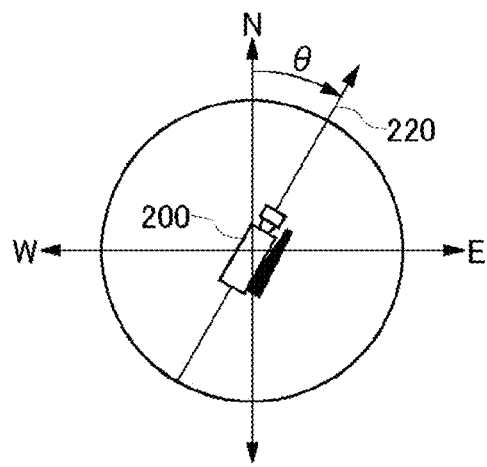
FIGS. 5A to 5C are illustrations with which to explain a panoramic image shot when an initial position of a camera is in a direction of azimuth angle θ.
Figure 5B:
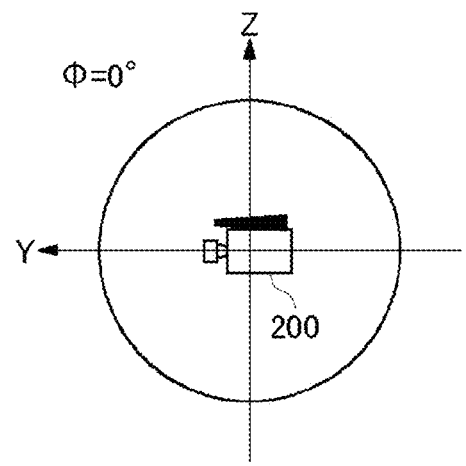
Figure 5C:
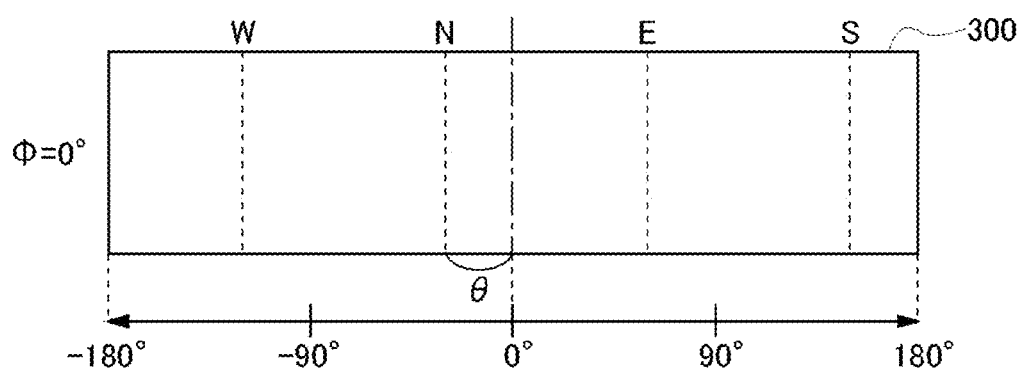

FIGS. 5A to 5C are illustrations with which to explain a panoramic image shot when the initial position of the camera 200 is in a direction of the azimuth angle φ.

As shown in the top view of FIG. 5A, the camera 200 in the initial position faces the direction 220 of azimuth angle θ. And as shown in the side view of FIG. 5B, the elevation angle of the camera 200 is φ=0°. With the elevation angle kept at φ=0°, an omnidirectional panoramic view is shot at the elevation angle φ=0° while the pan angle of the camera 200 with respect to the reference direction 220 is varied within a range of −180° to +180°. FIG. 5C is a panoramic image 300 taken in the above-described manner. At the center of the panoramic image 300, the pan angle is 0°. The left half of the panoramic image 300 is an image such that it is taken by varying the pan angle within a range of 0° to −180°. Similarly, the right half of the panoramic image 300 is an image such that it is taken by varying the pan angle within a range of 0° to 180°.

The central position of the pan angle 0° is displaced from true north by azimuth angle θ. Thus, the positions of north (N), south (S), east (E), and west (W) are those indicated by dotted lines. As long as the panoramic image 300 contains the azimuth angle θ of the central position of pan angle 0° as the information on the shooting orientations, the pixel positions of north (N), south (S), east (E), and west (W) can be evaluated in consideration of a displacement of the azimuth angle θ. Alternatively, instead of the azimuth angle θ, the coordinate values of pixel positions of north (N), south (S), east (E), and west (W) may be used as the information on the shooting orientations.

In order to obtain a spherical panoramic image, it is necessary to take images by varying the elevation angle of the camera 200. For example, if the angle of view of the camera 200 is 60°, a spherical panoramic image can be theoretically obtained as follows. That is, the camera 200 is tilted vertically at ±60°, and the similar image taking is done by varying the pan angle within a range of −180° to +180°.

Figure 6A:
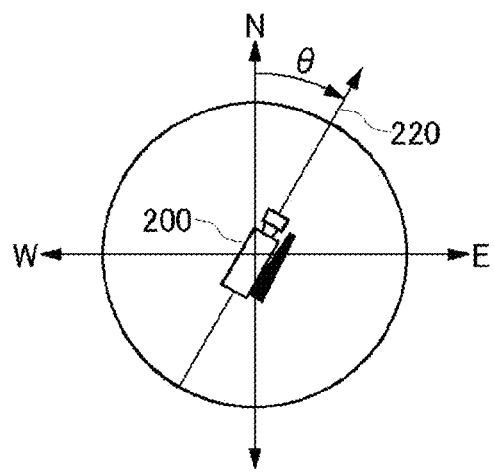
FIGS. 6A to 6C are illustrations with which to explain a panoramic image shot when a camera is in a direction of elevation angle φ=60°.
Figure 6B:
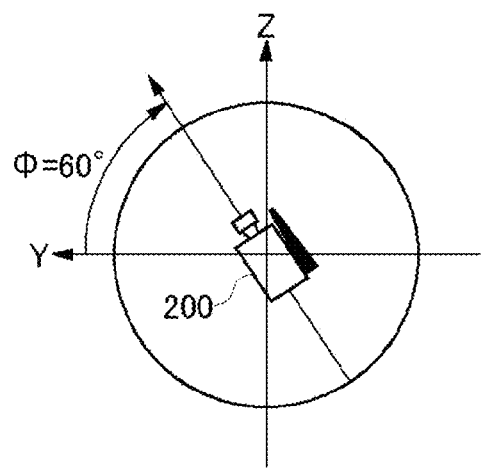
Figure 6C:
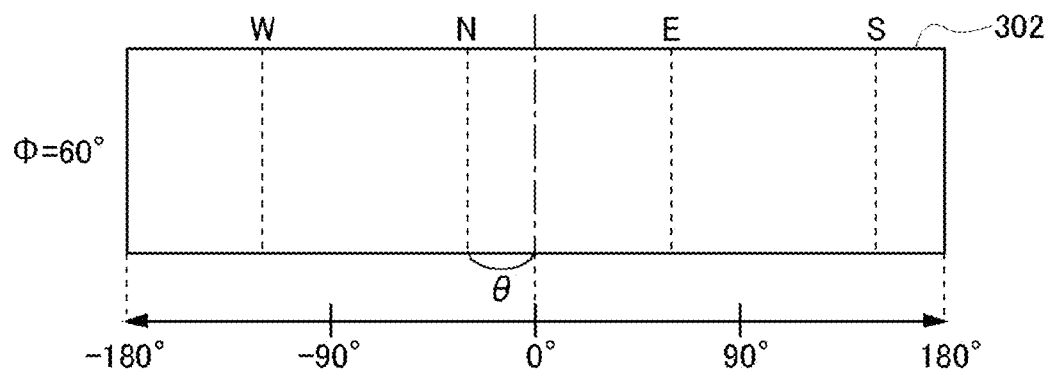

FIGS. 6A to 6C are illustrations with which to explain a panoramic image shot when a camera 200 is in a direction of elevation angle φ=60°. As shown in the top view of FIG. 6A, the camera 200 in the initial position faces the direction 220 of azimuth angle θ. And as shown in the side view of FIG. 6B, the elevation angle of the camera 200 is φ=0°. With the elevation angle kept at φ=60°, a panoramic view 302 as shown in FIG. 6C is shot at the elevation angle φ=60° while the pan angle of the camera 220 with respect to the reference direction 220 is varied within a range of −180° to +180°.

With the elevation angle kept at φ=−60°, a panoramic view 302 is similarly shot at the elevation angle φ=−60° while the pan angle is varied within a range of −180° to +180°. A spherical panoramic image is obtained by combining the panoramic images shot at the elevation angles φ=0°, 60°, and −60. However, in implementation, a method is often employed where the vicinities of a boundary (bordering areas) are taken in an overlapped manner, in order to correct the mismatch caused by lens distortions when images are stitched together in boundary portions at the angle of view.

The spherical panoramic image obtained as described above is endowed with information on azimuth angles and elevation angles. Therefore, it is possible to identify the azimuth and elevation angle of an arbitrary pixel of the panoramic image based on the information. Also, the panoramic image is provided with the latitude and longitude information measured by GPS as the positional information of the shooting location. The additional information to be attached to the panoramic image may be recorded, for example, in the format of image file called Exif (Exchangeable Image File Format). The place-name of the shooting location can be recorded in a part of the file name, whereas the shooting date and time, the latitude and longitude of the shooting location, the altitude, the azimuth angle, and the like can be recorded as data in the Exif format. The elevation angle, which is not defined in the Exif format, is recorded as extended data.

Figure 7A:
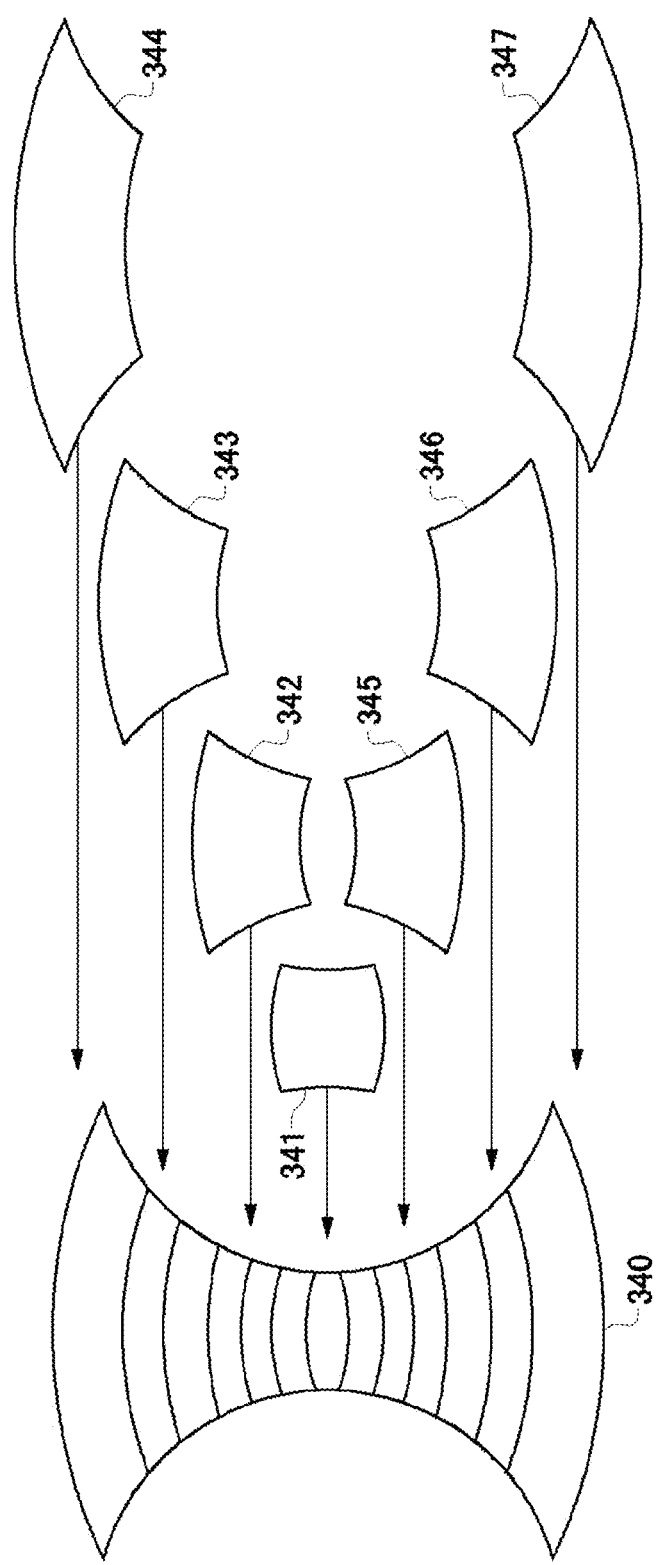
FIG. 7A explains a method of how a panoramic image is created by stitching a plurality of images together.
Figure 7B:
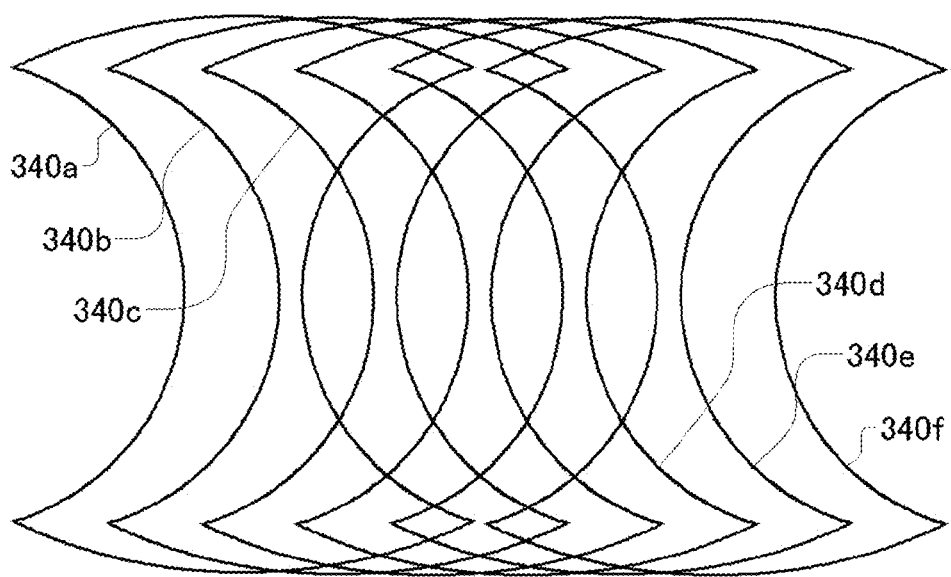
FIG. 7B explains a method of how a panoramic image is created by stitching a plurality of images together.

FIG. 7A and FIG. 7B are illustrations with which to explain a method of creating a panoramic image by stitching a plurality of images together.

In the example of FIG. 7A, seven images 341 to 347 shot by tilting (or panning) the camera 200 are mapped into a cylinder and then stitched together to prepare a cylindrical image 340. When the images are stitched together, the bordering areas of the images are overlapped with each other.

As shown in FIG. 7B, a plurality of cylindrical images like one shown in FIG. 7A are obtained in the panning (or tilting) direction by the shooting with the panning (or tilting) of the camera 200. An omnidirectional panoramic image 360 is finally obtained by synthesizing these cylindrical images 340a to 340f with the bordering areas of the images overlapped.

Figure 8:
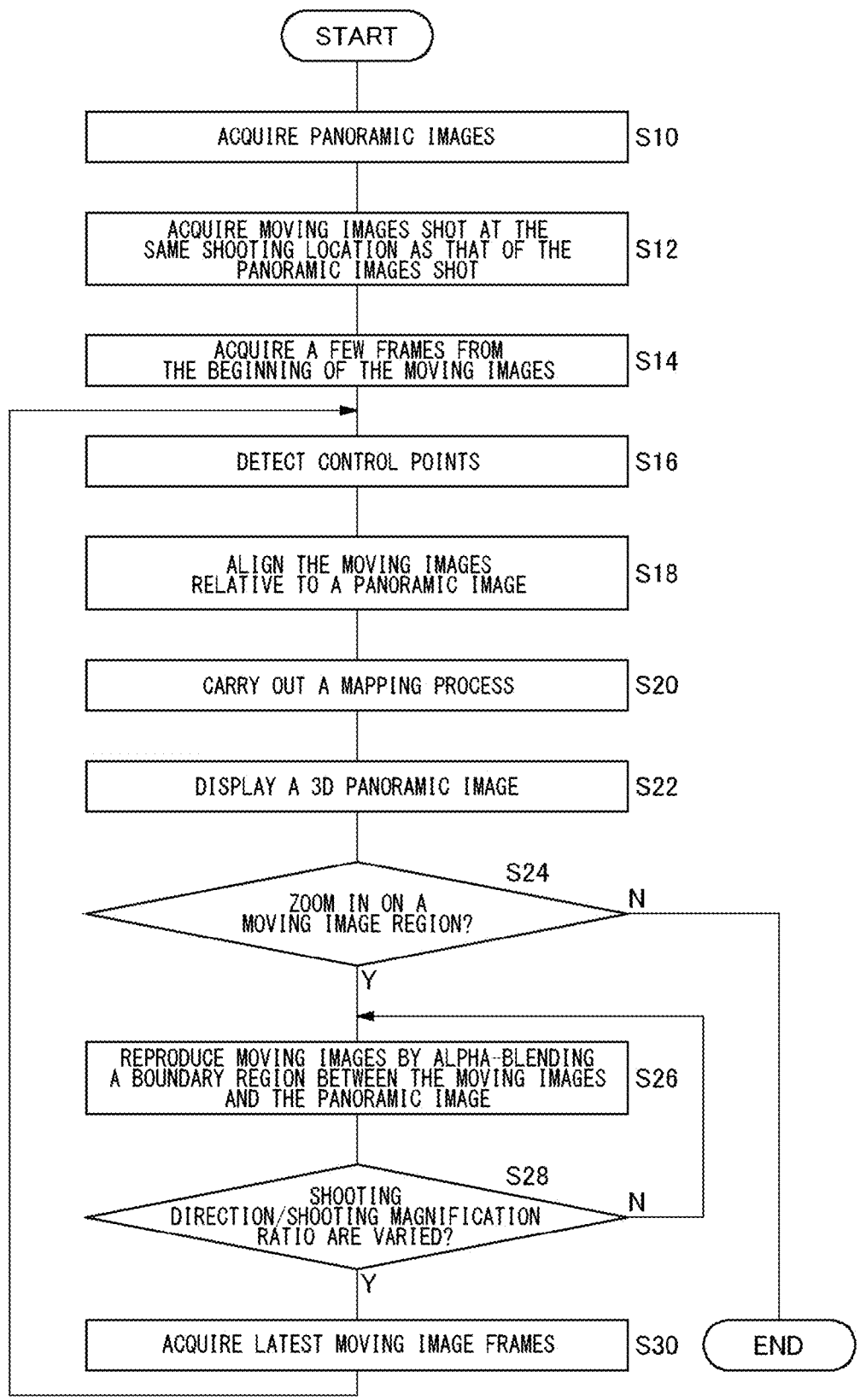
FIG. 8 is a flowchart to explain a procedure for generating a panoramic image by the panoramic image display apparatus of FIG. 1.

FIG. 8 is a flowchart to explain a procedure for generating a panoramic image by the panoramic image display apparatus 100. Each step in the procedure, for generating the panoramic image, shown in FIG. 8 by referring to FIGS. 9A and 9B to FIG. 16. In the flowchart shown in FIG. 8, the procedure of each structural component is shown using S (the capital letter of "Step"), which means a step, and numbers combined. If a determining process is executed in a processing indicated by the combination of S and a number and if the decision result is positive, "Y" (the capital letter of "Yes") will be appended like "(Y of S24)". If, on the other hand, the decision result is negative, "N" (the capital letter of "No") will be appended like "(N of S24)".

The panoramic image acquiring unit 10 acquires panoramic images 400 shot and information on the shooting locations appended to the panoramic images 400, from the panoramic image/additional data storage 24 (S10). The moving image acquiring unit 11 acquires moving images shot at the same shooting location or near their shooting location, from the image data storage 26 (S12).

The control point detector 20 acquires several frames of the moving images 500 starting from the beginning thereof (S14), extracts feature points by which the matching may be obtained between the panoramic image 400 and the frames of the moving images 500, and selects control points by which to position the frames of the moving image 500 in a region of the panoramic image 400 (S16).

FIG. 9A and FIG. 9B are examples of a panoramic image 400 and a moving image 500 to be pasted onto the panoramic image 400, respectively. In this case, four control points are detected between the panoramic image of FIG. 9A and a leading frame of the moving images 500, and the respective control points associated with the two images are associated with each other using the dotted lines.

The alignment processing unit 12 adjusts the alignment of the moving image 500 relative to the panoramic image 400, based on the control points, and associates the moving image with the region of the panoramic image 400 (S18).

FIG. 10 shows another moving image 510 to be pasted onto a panoramic image. The moving images 510 are those taken of a Ferris wheel. FIG. 11 is a panoramic image 410 to which the moving image 510 of FIG. 10 has been pasted. The panoramic image 410 has the image of the Ferris shot in the first place, and a still image of the leading frame of the moving images 510 for the Ferris wheel is pasted onto the region where the Ferris while was shot. In another exemplary embodiment, though the moving images of the Ferris wheel are not taken on the panoramic image 410, the moving image 510 may be pasted onto the panoramic image 410, in which case the Ferris wheel can be virtually located in a position of the panoramic image 410.

Referring back to the flowchart of FIG. 8, the mapping processing unit 14 maps the panoramic image 400 associated with the moving images 500 and 510, onto a panoramic sphere (S20). The 3D image generator 16 generates a three-dimensional (3D) panoramic image when the 3D panoramic sphere, onto which the moving images 500 and 510 have been mapped, is viewed in a specified line of sight and then the display control unit 18 displays the thus generated 3D panoramic image (S2).

If the user zooms in on regions including the moving images 500 and 510 pasted onto the panoramic images 400 and 410, respectively (Y of S24), the moving image reproduction unit 22 will start to reproduce the moving images 500 and 510. Thereby, the scenes showing how the illumination of some buildings goes on and off and how an elevator goes up and down are reproduced in the moving images 500, and the scenes of how the Ferris wheel rotates is reproduced in the moving images 510. If no zoom-in operation is performed on the moving images 500 and 510 (N of S24), the process of generating the panoramic images is terminated.

When generating the moving images, the moving image reproduction unit 22 alpha-blends the boundary region of the moving images 500 and 510 with the panoramic images 400 and 410 (S26).

FIG. 12 is an image 412 displayed when the panoramic image 410 shown in FIG. 11 is zoomed in on the region thereof where the moving images 510 have been pasted. Reproduction of the moving images 510 results in the movement of the boundary for each frame in a boundary region 512 of the moving images 510 with the panoramic image 410 because of a camera-shake. Therefore, blur or mismatch may occur in the boundary region. This is because several frames from the beginning of the moving images 510 are aligned to the panoramic image but the control points of all frames of the moving images do not necessarily match the control points of the panoramic image in consequence of the camera-shake. The blur or mismatch in the boundary region resulting from the camera-shake does not occur when the still image frames of the moving images 510 are pasted onto the panoramic image 410 as in FIG. 11 but it occurs when the region is zoomed in and then the moving images 510 are reproduced.

Thus, the moving image reproduction generator 22 alpha-blends the pixels of each frame of the moving images 510 and pixels of the panoramic image 410 at the boundary region 512 of the moving images 510 with the panoramic image 410 so as to carry out a post-processing. This can make the blur or mismatch less conspicuous.

If, during reproduction of moving images, the variation in the shooting direction or shooting magnification ratio between frames is within a predetermined threshold value (N of S28), the process of Step S26 will be repeated. If the shooting direction or shooting magnification ratio between frames varies in excess of the predetermined threshold value (Y of S28), the moving image reproduction unit 22 will acquire several frames after the change in the shooting direction or shooting magnification ratio ("latest frames" or "most recent frames") (S30). And the procedure returns to Step S16, the control point detector 20 detects new control points with which to associate the most recent frames of the moving images with the region of the panoramic image, and the alignment processing unit 12 readjusts the alignment of the moving images based on the newly detected control points so as to relate the last displayed frame of the moving images to the panoramic image.

With reference to FIG. 13 to FIG. 16, a description is given of the readjustment of the alignment of moving images. FIG. 13 shows a panoramic image 420 to which moving images 520 have been pasted. The moving images 520 are those taken of a horse and a carriage. The matching is obtained between the background image of the moving images 520 and the moving images 520 themselves and thereby the leading frame of the moving images 520 is associated with a region of the panoramic image 420 and then pasted onto the region thereof.

FIGS. 14A, 14B and 14C each shows how the moving images 520 are reproduced by zooming in on a region of the moving images 520 in the panoramic image 420. Frames in FIG. 14A, FIG. 14B, and FIG. 14C are those reproduced in order of time (left to right). The carriage advances from right to left in the panoramic image 420 and reach in front of the Ferris wheel.

Figure 15:
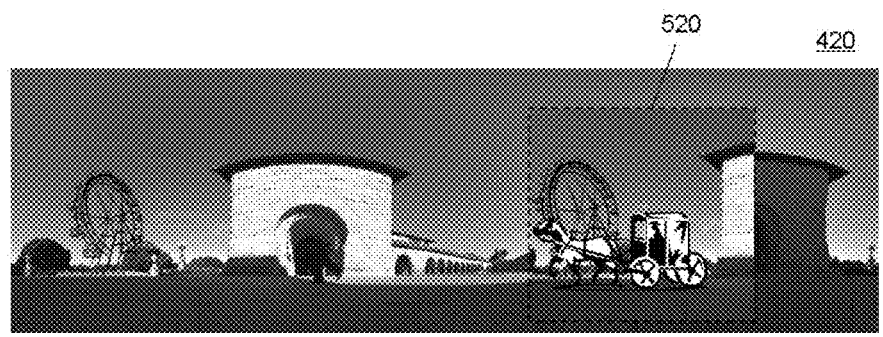
FIG. 15 is an example of a screen when an image displayed on the screen has returned to the panoramic image of FIG. 13 through a zoom-out.

FIG. 15 is an example of a screen when an image displayed on the screen has returned to the panoramic image of FIG. 13 through a zoom-out. When the image is zoomed out, the reproduction of the moving images is interrupted and the last displayed frame is displayed. Or the reproduction of the moving images may continue even after the zoom-out and then the most recent frames may be displayed. For comparison, a description is given herein of a case where the alignment is not readjusted. The moving images are aligned at the right side of the panoramic image 420 based on the first alignment result of the moving images 520 but the image being displayed is the last displayed frame or the most recent frame of FIG. 14C. Thus the background of the moving images 520, which does not match the panoramic image 420, looks unnatural.

Figure 16:
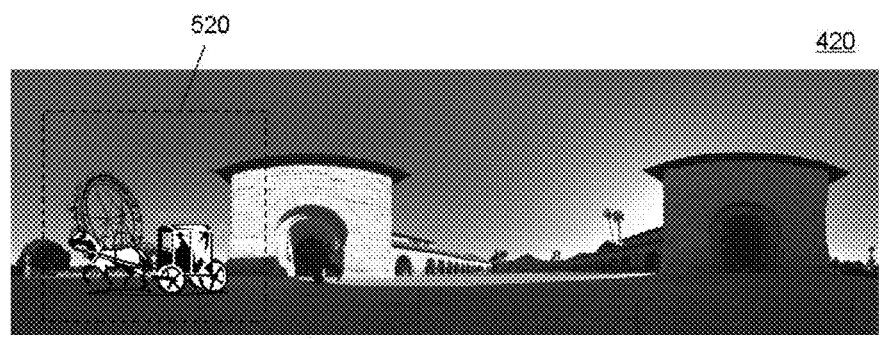
FIG. 16 is an example obtained when a moving image, the alignment of which has been readjusted, is pasted onto a panoramic image.

FIG. 16 is an example obtained when the moving images 520, the alignment of which has been readjusted, are pasted onto the panoramic image 420. The control points of the background image in the last displayed frame of the moving images 520 are associated with the control points of a destination region in the panoramic image 420, so that the background of the moving images 520 matches the panoramic image 420. If, as described herein, an object (the carriage in this example) shot in the moving images 520 moves from one spot to another, the position at which the moving images 520 are pasted onto the panoramic image 420 will be moved, too, following the object.

If the reproduction of moving images is interrupted after a zoom-out and if the leading frame, instead of the last displayed frame, is to be displayed, the moving images 520 will preferably be aligned, as shown in FIG. 15, at the right side of the panoramic image 420 based on the first alignment result thereof.

The position at which the moving images 520 are pasted may be moved at the time of a zoom-out. Also, the position at which the moving images 520 are pasted may be moved to within the panoramic image 420 in real time by adjusting the control points of each frame of the moving images 520 to the control points in the panoramic image 420. While an image is being zoomed in, a part of the panoramic image 420 may be displayed around the moving images 520. In such a case, the pasting position of each frame is moved to within the panoramic image during reproduction of the moving images 520, so that the background image of each frame can be made to match the panoramic image 420 and therefore the continuity can be maintained.

As described above, the panoramic image display apparatus according to the present embodiments can accurately paste the still image frame or frames of the moving images to the panoramic image, based on the acquired control points of several frames from the beginning of the moving images and can display the panoramic image with the still image frame or frames accurately pasted thereonto. The reproduction of moving images starts automatically when the region of the panoramic image, where moving images are pasted, is zoomed in. Though the positions of control points differ frame by frame due to a camera-shake, artifact or blur at the boundary region can be made less conspicuous by alpha-blending the pixel values of the moving images and the panoramic image at the boundary region of the moving images with the panoramic image.

As the reproduction of moving images is interrupted, the control points of a frame or frames displayed at the time of interruption is/are acquired and then the frame or frames of the moving images are pasted onto the panoramic image. Thus the continuity with the panoramic image can be maintained when the frame or frames are zoomed out. If particularly the object moves and the shooting direction varies, the position at which the moving images are to be pasted is moved within the panoramic image, so that the continuity can be maintained between the moving images and the panoramic image.

The present invention has been described based upon illustrative embodiments. These embodiments are intended to be illustrative only and it will be obvious to those skilled in the art that various modifications to the combination of constituting elements and processes could be developed and that such modifications are also within the scope of the present invention.

In the foregoing description, a panoramic image associated with moving images is mapped into the 3D panoramic space such as a sphere and then a 3D panoramic image when the 3D panoramic space is viewed in a specified line of sight is displayed on the screen. However, the panoramic image associated with the moving images may be simply displayed two-dimensionally. In this case, there is no need for construction of the mapping processing unit 14 and the 3D image generator 16, thus simplifying the panoramic image display apparatus 100. In this case, too, as the region of the moving images associated with the two-dimensionally displayed panoramic image is zoomed in, the moving images are automatically reproduced. Or the reproduction of the moving images may be started when the user selects a symbol indicating that the moving images are associated with the panoramic image.

Panoramic images herein are not limited to ones shot by the omnidirectional image shooting system as shown in FIG. 3, but they may be ones shot through a fish-eye lens or ones synthesized or merged from a plurality of images shot with a normal digital camera in different shooting directions.

In the foregoing description, the alignment processing unit 12 associates the moving images with a region of the panoramic image and then the mapping processing unit 14 maps the panoramic image and the still image frames of the moving images into a 3D panoramic space. As another method, the alignment processing unit 12 may synthesize or merge the still image frames of the moving images into the panoramic image, besides the alignment processing, based on the control points and then may map a panoramic image into which the still image frames of the moving images have been combined, into the 3D panoramic space.

Of the functional components of the panoramic image display apparatus 100, the components related to a function for mainly aligning and linking the moving images to the panoramic image may be implemented to a server, while the components related to a function for mainly viewing a panoramic image and the moving images linked to the panoramic image may be implemented to a client. Thereby, the panoramic image display apparatus 100 can be realized as a server-client system via a network. The server may carry out a process of aligning and linking the still image frames of the moving images to the panoramic image, and an interface with which to view the panoramic view linked to the moving images may be provided to the client. As the user zooms in on a region of the moving images on a display screen of the client, content of the coded streams of the moving images may be delivered from the server and then the client may decode the content and reproduce the moving images.

The "panoramic image" as used in this patent specification is not limited to a "panorama" image in the narrow sense, namely a horizontally or vertically long image or a panoramic view of 360 degrees, but simply an image that covers a wide range of area. Also, explained in the embodiments is an example where the moving images are pasted onto the panoramic image, which is an object image. Note that the object image does not have to be a so-called panoramic image and that the present invention is applicable to a normal image of arbitrary size serving as the object image. Or the object image may be an image where a plurality of images having different resolutions are hierarchized. Such a hierarchized image may be constructed such that when a partial region of image is enlarged, the enlarged region is replaced by an image of a higher resolution.

What is claimed is:

1. An image display apparatus comprising:
a detector configured to extract a feature point between an object image and a frame of part of a moving image to be pasted onto the object image, and configured to detect a control point with which the moving image is associated with a region of the object image;
an alignment processing unit configured to adjust alignment of the moving image relative to the object image based on the control point;
a mapping processing unit configured to map the object image and a still image frame of the moving image, the alignment of which adjusted by the alignment processing unit, onto a three-dimensional (3D) object space as a texture;
a three-dimensional (3D) image generator configured to generate a three-dimensional (3D) object image, when the three-dimensional object image mapped by the mapping processing unit is viewed in a specified line of sight in such a manner so as to regard a shooting location of the object image as a viewpoint position;
a display control unit configured to display the 3D object image on a screen; and
an interface configured to receive an instruction from a user concerning the displayed 3D object image; and
a moving image reproduction unit configured to reproduce the moving image, when the interface receives an instruction to reproduce the moving image onto the 3D object image.

2. An image display apparatus according to claim 1, wherein, when the interface receives an instruction to zoom in on a region containing the moving image on the 3D object image, the moving image reproduction unit starts to reproduce the moving image instead of the still image frame of the moving image pasted onto the object image.

3. An image display apparatus according to claim 1, wherein, when the moving image is reproduced, the moving image reproduction unit alpha-blends a boundary region of the moving image with the object image, whereby adverse effects caused by a discrepancy between the object image and a frame of the moving image in which no control points have been detected are reduced.

4. An image display apparatus according to claim 1, wherein, when a shooting direction or shooting magnification ratio of the moving image varies in excess of a predetermined threshold value, the detector detects a new control point, with which to associate the moving image with the object image, by extracting a feature point between a most recent frame of the moving image, whose shooting direction or shooting magnification ratio has been varied, and the object image, wherein the alignment processing unit readjusts the alignment of the moving image relative to the object image based on the control point of the most recent frame, and wherein the mapping processing unit maps the object image and the most recent frame of the moving image, the alignment of which readjusted by the alignment processing unit, onto a 3D object space as a texture.

5. An image display apparatus according to claim 1, wherein the object image is a panoramic image and the 3D object space is a 3D panoramic space.

6. An image display apparatus comprising:

an alignment processing unit configured to adjust alignment of frame of at least part of a moving image relative to an object image, upon receipt of the object image and the moving image to be pasted onto the object image;

a display control unit configured to display both a still image frame of the moving image, the alignment of which adjusted by the alignment processing unit, and the object image in a manner such that the still image frame thereof is superimposed onto the object image;

an interface configured to receive an instruction from a user concerning the object image displayed by the display control unit; and a moving image reproduction unit configured to reproduce the moving image, when the interface receives an instruction to reproduce the moving image onto the three-dimensional object image, wherein, when the interface receives an instruction to zoom in on a region containing the moving image in the object image, the moving image reproduction unit starts to reproduce the moving image instead of the still image frame of the moving image.

7. An image display apparatus according to claim 6, wherein, when the moving image is reproduced, the moving image reproduction unit alpha-blends a boundary region of the moving image with the object image, whereby adverse effects caused by a discrepancy between the object image and a frame of the moving image in which no control points have been detected are reduced.

8. An image display apparatus according to claim 6, wherein, when a shooting direction or shooting magnification ratio of the moving image varies in excess of a predetermined threshold value, the alignment processing unit readjusts the alignment of the moving image, whose shooting direction or shooting magnification ratio has been varied, relative to the object image, wherein the display control unit displays both a most recent frame of the moving image, the alignment of which adjusted by the alignment processing unit, and the object image in a manner such that the most recent frame thereof is superimposed onto the object image.

9. An image display apparatus according to claim 6, wherein the object image is a panoramic image.

10. An image generation method comprising:

reading out, from a storage device by a processor, an object image and a moving image to be pasted onto the object image, and configured to adjust alignment of a frame of at least part of the moving image relative to the object image, displaying, by a processor, a still image frame of the moving image, the alignment of which adjusted, and the object image in a manner such that the still image frame thereof is superimposed onto the object image;

receiving, by a processor, an instruction from a user concerning the displayed object image; and initializing reproduction, by a processor, of the moving image instead of the still image frame of the moving image, when an instruction is received to zoom in on a region containing the moving image on the object image.

11. A program embedded in a non-transitory computer-readable medium, the program comprising:

a detection module operative to extract a feature point between an object image and a frame of part of a moving image to be pasted onto the object image, and operative to detect a control point with which the moving image is associated with a region of the object image;

an alignment processing module operative to adjust alignment of the moving image relative to the object image, based on the control point;

a mapping processing module operative to map the object image and a still image frame of the moving image the alignment of which adjusted by the alignment processing module, onto a three-dimensional (3D) object space as a texture;

a three-dimensional (3D) image generation module operative to generate a three-dimensional (3D) object image, when the three-dimensional object image mapped by the mapping processing module is viewed in a specified line of sight in such a manner so as to regard a shooting location of the object image as a viewpoint position;

a display control module operative to display the 3D object image on a screen;

an interface module operative to receive an instruction from a user concerning the displayed 3D object image; and a moving image reproduction module operative to reproduce the moving image, when received is an instruction to reproduce the moving image onto the 3D object image.

12. A non-transitory computer-readable medium encoded with a program, executable by a computer, according to claim 11.

* * * * *